T. FOGG.
Convertible Freight-Cars.

No. 138,142.　　　　　　　　　　　Patented April 22, 1873.

Witnesses:
John Becker
W. A. Graham

Inventor:
T. Fogg
per
Attorneys.

UNITED STATES PATENT OFFICE.

THOMAS FOGG, OF ST. MARY'S, CANADA.

IMPROVEMENT IN CONVERTIBLE FREIGHT-CARS.

Specification forming part of Letters Patent No. 138,142, dated April 22, 1873; application filed May 25, 1872.

*To all whom it may concern:*

Be it known that I, THOMAS FOGG, of St. Mary's, in the province of Ontario and Dominion of Canada, have invented a new and useful Improvement in Convertible Freight-Cars, of which the following is a specification:

The object of this invention is to construct a railroad freight-car so that it may be readily converted from an ordinary freight or box car to a car for transporting grain in bulk, provided with a spout or chute for discharging the grain, the construction and arrangement being as hereinafter more fully described.

Figure 1:
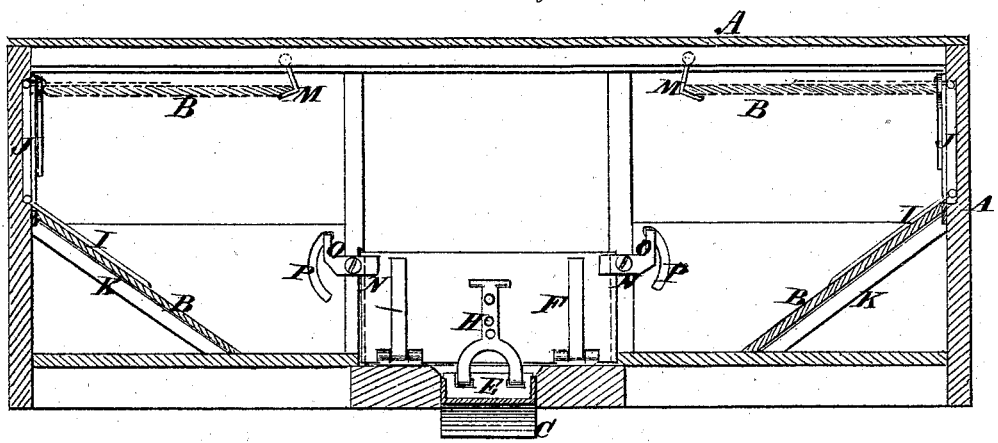
Figure 2:
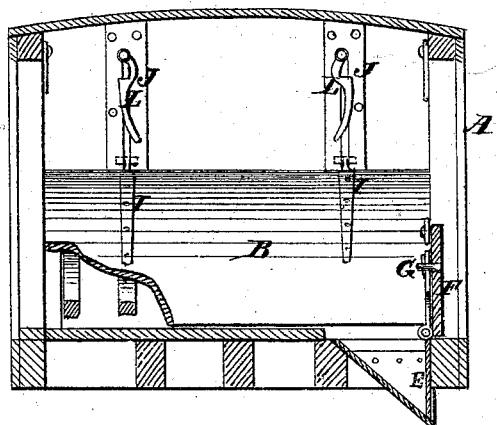

In the drawing hereto annexed, Figure 1 represents a vertical longitudinal section of the convertible car. Fig. 2 is a vertical cross-section, and Fig. 3 is a sectional view of the bottom.

Similar letters of reference indicate corresponding parts.

A represents the car which, in size, form, and proportions, may not differ from the ordinary box-car. It is provided with doors in the sides like the ordinary car. To adapt the car for transporting grain and to facilitate the discharge thereof, I attach thereto adjustable end pieces or flaps B B, by which means the car is made to resemble a hopper; and in the central part of the bottom of the car I arrange a spout or chute, C, for the discharge of the grain. D shows the aperture in the bottom of the car which chutes the grain to the side beneath the bottom, from whence it is conveyed by a spout or elevator to the desired place for storing or otherwise disposing of it. E is a vertical slide for closing the chute. F is a hinged section of the car-floor, which is made to turn up in a vertical position, as seen in the drawing, when the car contains grain. In this position it is made to support the slide E, as seen in Fig. 1, the handle H being held in position by a pin and key, as seen at G, Fig. 2. When other freight than grain is carried, the handle which is jointed to the slide is turned down to a horizontal position, and the hinged section F of the car-floor is turned down over it so as to make the surface of the bottom of the car smooth and uniform. The flaps B B may be arranged and secured in any manner.

In this example of my invention I attach one or more bars, I, to the flaps, which are connected with the ends of the car by slotted plates J, which allow the flaps to drop down onto the angular cleats K on the sides of the car. When thus arranged, as seen in Fig. 1, they present the grain for entering the end angles of the car and allow it to slide forward toward the center chute. When not in use for this purpose they slide up in the slotted plates, where they are supported by hooks L and m, as seen in dotted lines in Fig. 1. The hinged section of the bottom F is held up in a vertical position by the buttons N N attached to the car-stanchion. The action of these buttons is limited by the angular shanks o o which enter the curved cavities P P in the sides of the car.

By this mode of construction it will be seen that the car may be used either for ordinary freight, as common box-cars are used, or for grain in the bulk, the change from one to the other being readily and speedily made.

Having thus described my invention, I claim as new and desire to secure by Letters Patent—

1. In combination with a box or freight car the hinged section F of the car-floor, the chute C, and the vertical slide E, when the same are arranged substantially as and for the purposes described.

2. The slotted plates J, bars I, and hooks L and m, in combination with the flaps B B, for the purposes described.

3. The hinged handle H of the vertical slide, substantially as and for the purpose described.

THOMAS FOGG.

Witnesses:
 GEORGE ROBINSON,
 DANIEL WATERS.